(12) United States Patent
Paasch et al.

(10) Patent No.: US 7,182,360 B2
(45) Date of Patent: Feb. 27, 2007

(54) BICYCLE OR SKATEBOARD PEG WITH INDEPENDENTLY ROTATABLE SURFACE

(75) Inventors: Robert William Paasch, Aumsville, OR (US); Keith Allen Paasch, Salem, OR (US)

(73) Assignee: Roller Peg, Inc., Salem, OR (US)

( * ) Notice: Subject to any disclaimer, the term of this patent is extended or adjusted under 35 U.S.C. 154(b) by 0 days.

(21) Appl. No.: 11/026,771

(22) Filed: Dec. 30, 2004

(65) Prior Publication Data

US 2005/0151347 A1    Jul. 14, 2005

Related U.S. Application Data

(63) Continuation of application No. 10/404,290, filed on Mar. 31, 2003, now Pat. No. 6,863,292.

(60) Provisional application No. 60/368,772, filed on Mar. 29, 2002.

(51) Int. Cl.
*B62J 25/00*    (2006.01)

(52) U.S. Cl. .................................. 280/291; 280/288.4

(58) Field of Classification Search ................ 280/291, 280/288.4, 304.5, 293, 294; 74/564
See application file for complete search history.

(56) References Cited

U.S. PATENT DOCUMENTS

| | | | | |
|---|---|---|---|---|
| 3,670,357 A * | 6/1972 | Steigerwald | ................. | 16/105 |
| 3,918,323 A * | 11/1975 | Prager | ........................ | 74/551.8 |
| 4,154,452 A * | 5/1979 | Newman | ..................... | 280/293 |
| 4,700,964 A * | 10/1987 | Hess | ........................ | 280/288.4 |
| 4,943,172 A * | 7/1990 | Waldrep | ..................... | 384/565 |
| 5,330,221 A * | 7/1994 | Sutton | ........................ | 280/293 |
| 5,566,958 A * | 10/1996 | Sinelnikov et al. | .... | 280/11.231 |
| 5,826,900 A * | 10/1998 | Steele | ........................ | 280/291 |
| 5,884,983 A * | 3/1999 | Wu | ........................ | 301/124.1 |
| 6,142,499 A * | 11/2000 | Hsieh et al. | ................ | 280/291 |
| 6,149,179 A * | 11/2000 | Long | ........................ | 280/293 |
| 6,173,983 B1 * | 1/2001 | Moore | ........................ | 280/291 |
| 6,485,044 B1 * | 11/2002 | Blake | ........................ | 280/288.4 |
| 6,499,378 B1 * | 12/2002 | Ho | ........................ | 74/564 |
| 6,588,061 B2 * | 7/2003 | Becken | ........................ | 16/105 |
| 6,594,856 B1 * | 7/2003 | Cherukuri | ..................... | 16/34 |
| 6,663,129 B1 * | 12/2003 | Smith | ........................ | 280/291 |
| 6,719,316 B1 * | 4/2004 | Anthony | ..................... | 280/291 |
| 6,893,037 B1 * | 5/2005 | Galasso | ..................... | 280/276 |

* cited by examiner

*Primary Examiner*—Tony Winner
(74) *Attorney, Agent, or Firm*—Marger Johnson & McCollom, P.C.

(57) ABSTRACT

A roller peg includes a housing attachable to a bicycle or skateboard, the housing including a hole, and a roller that is inserted in the housing so that a surface of the roller protrudes from the hole and the roller spins within the housing.

22 Claims, 3 Drawing Sheets

US 7,182,360 B2

BICYCLE OR SKATEBOARD PEG WITH INDEPENDENTLY ROTATABLE SURFACE

CROSS REFERENCE TO RELATED APPLICATIONS

This application is a continuation of prior U.S. Ser. No. 10/404,290, filed Mar. 31, 2003, now issued as U.S. Pat. No. 6,863,292, which claims benefit of priority to Provisional Application No. 60/368,772, filed on Mar. 29, 2002.

BACKGROUND OF THE INVENTION

1. Technical Field of the Invention

This disclosure relates to accessories for wheeled devices, and in particular to a roller peg.

2. Description of the Related Art

In this country the sport of skateboarding and BMX (bicycle motor-cross) enjoy tremendous popularity among young people. With the growth of skate parks and bicycle parks, it has become common to attach what are known as "grinding pegs" to the front and rear axles of bicycles. These pegs extend in a perpendicular direction from the plane of the bicycle tire. The rider stands on one or more of these pegs, and the pegs allow the rider to "grind" to a stop, balance on the edge of objects, and/or quickly change the direction of momentum. Such pegs are typically round when viewed on end. They are typically made of aluminum and have a rough pattern on the exterior that provides a non-slip interface between the peg and the soles of the rider's shoes. The pegs are attached to the axle of the bicycle by threading inside the peg unit or with one or more nuts.

The pegs themselves are very durable. They need to support the weight of the rider and at times the weight of both the rider and the bicycle. However, because the pegs frequently come into contact with hard surfaces such as cement and metal, over time the pegs are worn down. It is not uncommon for a peg to break once the metal is sufficiently removed or weakened. At this point there is no repair possible and the bicycle rider must purchase a new peg.

Not only are hard surfaces damaging to the pegs, but the pegs are also damaging to the surfaces they contact. Missing paint on the top of metal handrails or unsightly black marks adorning the edges of cement structures is a sure sign of extended exposure to skateboards or grinding pegs. In some cases the corners and edges of these objects crumble altogether. As a consequence of the damage that they cause, grinding pegs are banned from many public parks and other areas that would otherwise provide good locations for the activity.

DETAILED DESCRIPTION OF THE INVENTION

Embodiments of the invention may be detachably affixed to bicycle axles. The components for one embodiment of the invention include a housing, a roller, a pin, and a keeper. The roller is inserted into the housing and a pin is inserted into the roller. The keeper is affixed to an end of the housing and keeps the pin and the roller in the correct position inside the housing. The housing has a hole that allows a surface of the roller to contact an external bicycle riding surface causing the roller to spin within the housing.

Embodiments of the invention allow bikers to perform stunts and tricks without causing damage to surfaces coming into contact with the peg. In addition, many new stunts and tricks are possible because the biker is allowed to travel quite quickly across surfaces using the peg. Additionally, since it is typically only the roller that comes into contact with external surfaces, there is no need to buy a new peg unit once the roller is worn down. The biker only needs to detach the keeper and remove the pin in order to replace the roller. This and other advantages of embodiments of the invention will become readily apparent in the following discussion where a specific embodiment of the invention is explained.

Figure 1A:
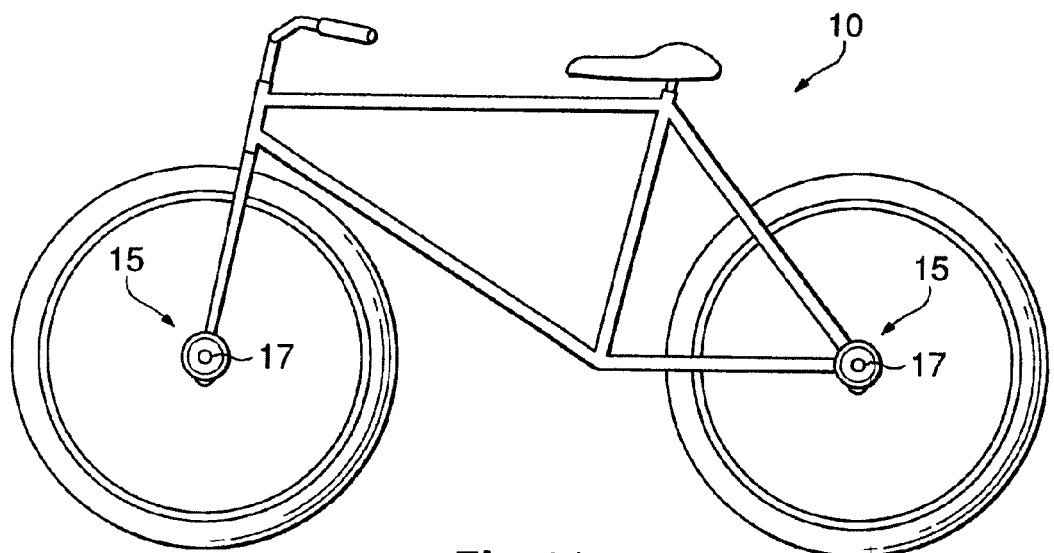
FIG. 1A is a side-view of a simplified bicycle showing the location of the roller pegs.
Figure 1B:
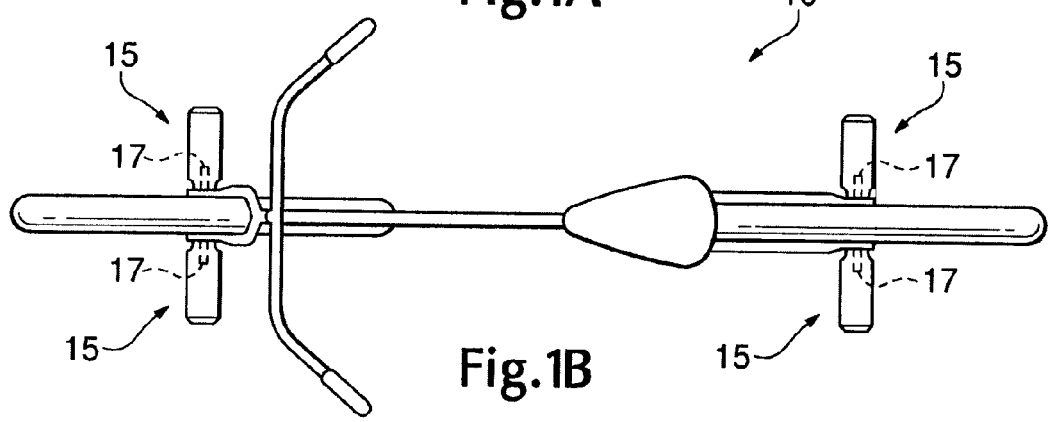
FIG. 1B is a top-view sketch of the simplified bicycle of FIG. 1A showing the location of the roller pegs.

FIGS. 1A and 1B are a side-view and top-view, respectively, of a simplified bicycle 10 showing the location of the bike peg. The sketches do not show all necessary elements of a bicycle and are not drawn to scale. However, these specifics are not required as the purpose of the sketches is to convey a sense of where an embodiment of the invention would be attached to a bicycle. Roller pegs 15 represent an embodiment of the invention and are located on either sides of the axles of bicycle 10. Up to four roller pegs 15 can be attached to a bicycle 10, two for every axle 17.

For the embodiments of the invention shown in FIGS. 1A and 1B, the roller pegs 15 extend from the axles of the bicycle 10. However, alternative embodiments of the invention contemplate the roller pegs 15 being attached to the bicycle axles at different radial angles with respect to the center line of the axle 17. In one embodiment of the invention, the biker may adjust this angle according to his own personal preferences. In another embodiment, the roller pegs 15 may be attached to the sides or ales of the skateboards or any other wheeled device.

Figure 2A:
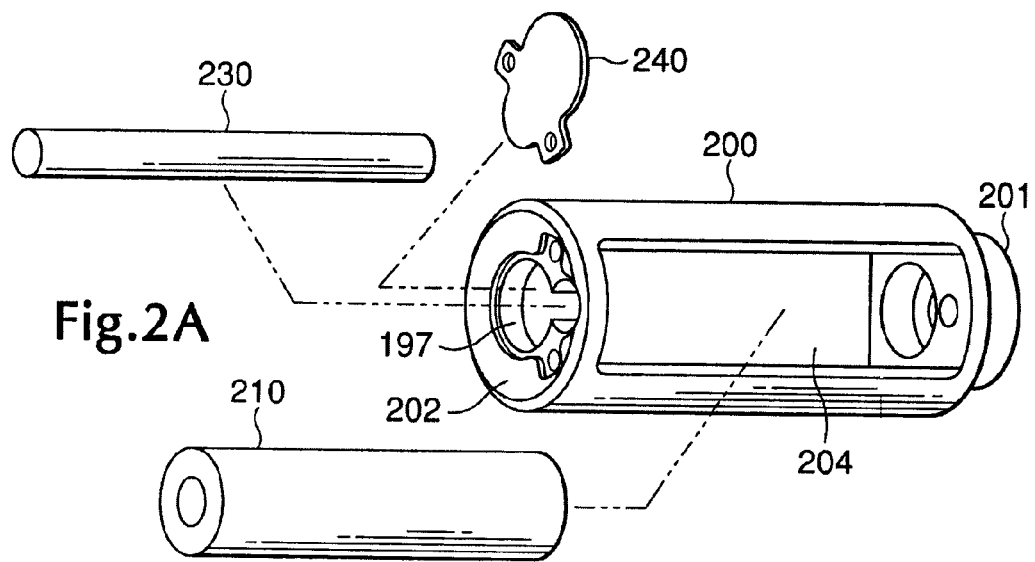
FIG. 2A is an exploded view of the roller pegs.

FIG. 2A is an exploded view of an embodiment of the invention showing some of the components. This embodiment includes a housing 200, a roller 210, a pin 230, and a keeper 240. The housing 200 is attached to the axle 17 (FIG. 1A) of bicycle 10 at an inner end 201 using threads (not shown) on the housing itself or using nuts (not shown). The housing 200 has a rectangular hole 204 that extends through a side of the housing 200, exposing the interior of the housing 200.

The roller 210 is inserted into the housing 200 at the outer end 202 through the larger diameter hole 197. Once inside the housing 200, the roller 210 is affixed into place using the pin 230. Pin 230 is inserted on the outer side 202 of the housing 200 and slides through the middle of roller 210.

Figure 2B:
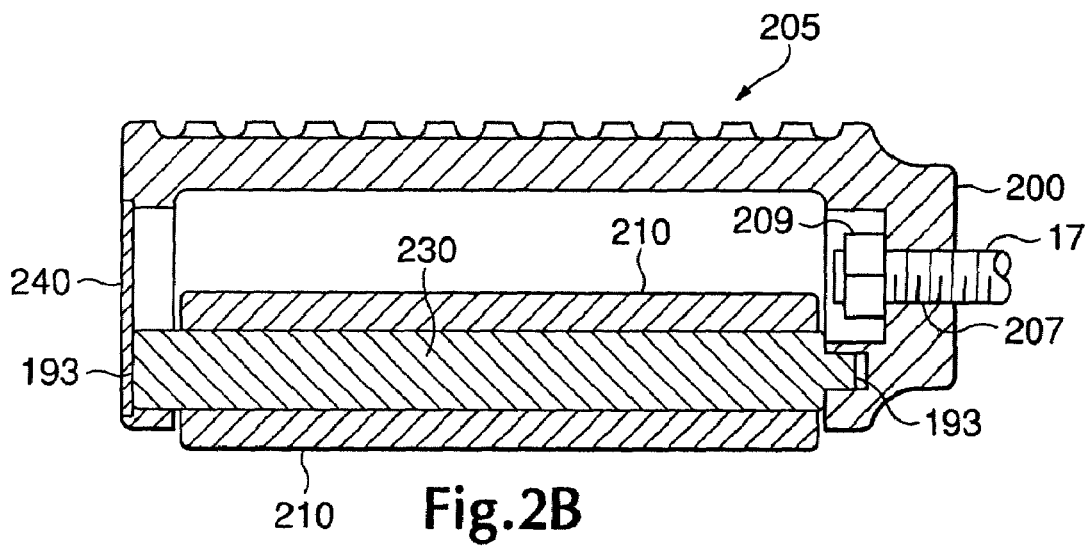
FIG. 2B is a cross-sectional view of an embodiment of the invention taken through the plane containing line A of FIG. 2D.
Figure 2C:
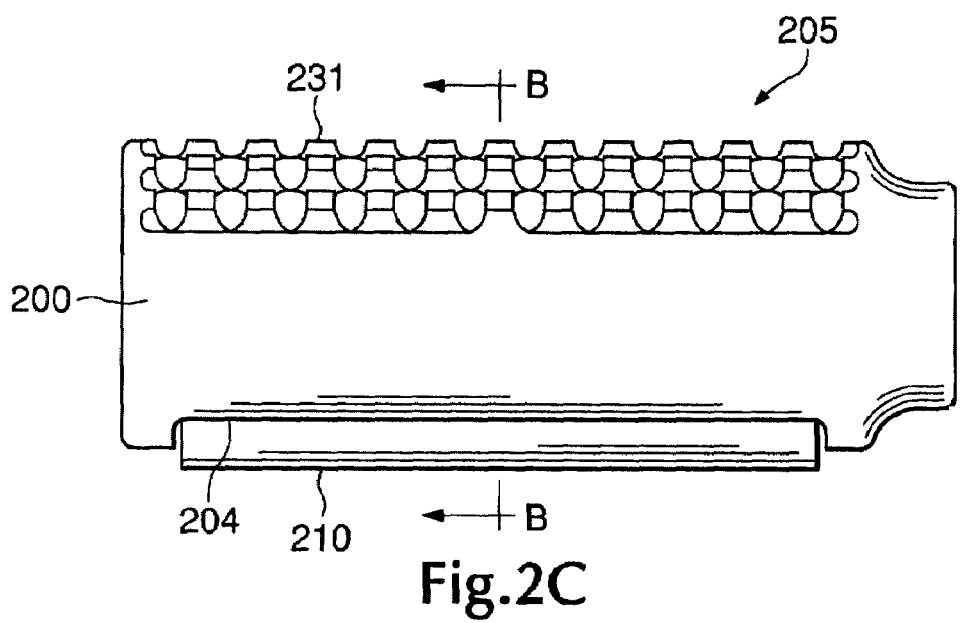
FIG. 2C is a side view of an embodiment of the invention.
Figure 2D:
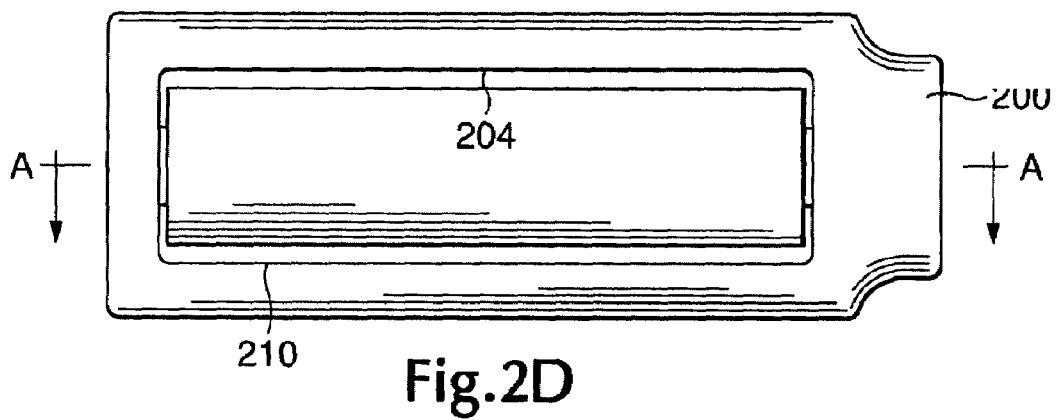
FIG. 2D is a bottom view of an embodiment of the invention.

FIG. 2B is a cross-sectional view taken through the plane containing line A—A of FIG. 2D. As shown in FIG. 2B, ends 193 of the pin 230 protrude from either side of the roller 210. The ends 193 of the pin 230 fit into receptacles at opposite ends of housing 200. The pin 230 holds the roller 210 spaced from but parallel to the primary axis of housing 200, allowing a surface of roller 210 to protrude outside of the hole 204. In this embodiment, there is also a patterned region 205 of protuberances 231 machined into the surface of housing 200. The function of the patterned region 205 is to increase the grip between the biker's shoes and the surface of the housing 200.

Returning to FIG. 2A, the keeper 240 fits over the pin 230 and roller 210 and is detachably affixed to the outer end 202 of the housing 200 with screws or another attachment device (not shown). The keeper 240 maintains the pin 230 and the roller 210 in the proper position within housing 200.

FIG. 2C is a side view of the roller peg 15. The roller 210 extends from the bottom of the housing 200. The patterned region 205 is located at the top of housing 200 and substantially opposite the hole 204. In alternative embodiments, the patterned region may extend over more or less area of the housing 200. In alternative embodiments, the patterned region may be replaced with an inset of material that is different from the material of the housing 200. For example, a rectangular portion of PVC or polyethylene rubber may be inset over a top surface of the housing 200 that is substantially opposite the roller 210. Alternatively, materials are glued to the top surface of the housing 200 to provide increased traction. FIG. 2D is a bottom view of the roller peg 15 showing the roller 210 extending through the hole 204 of the housing 200.

Figure 2E:
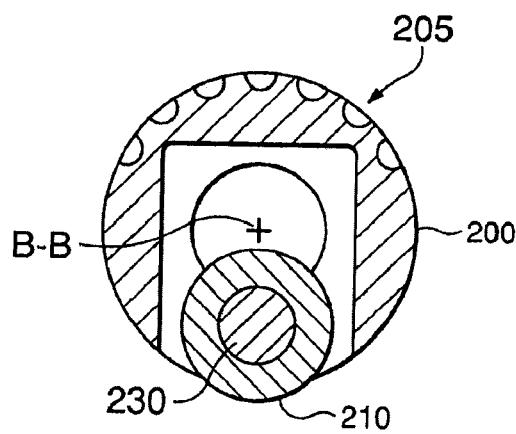
FIG. 2E is a side section view along the line B—B of FIG. 2C.

FIG. 2E is side view taken through the plane extending along line B—B of FIG. 2C. In this view the pin 230 is seen inserted within the roller 210. The pin 230 and roller 210 are aligned parallel to, but offset from, a center axis A—A of the housing 200. This allows a portion of the roller 210 to protrude outside the housing 200.

Figure 2F:
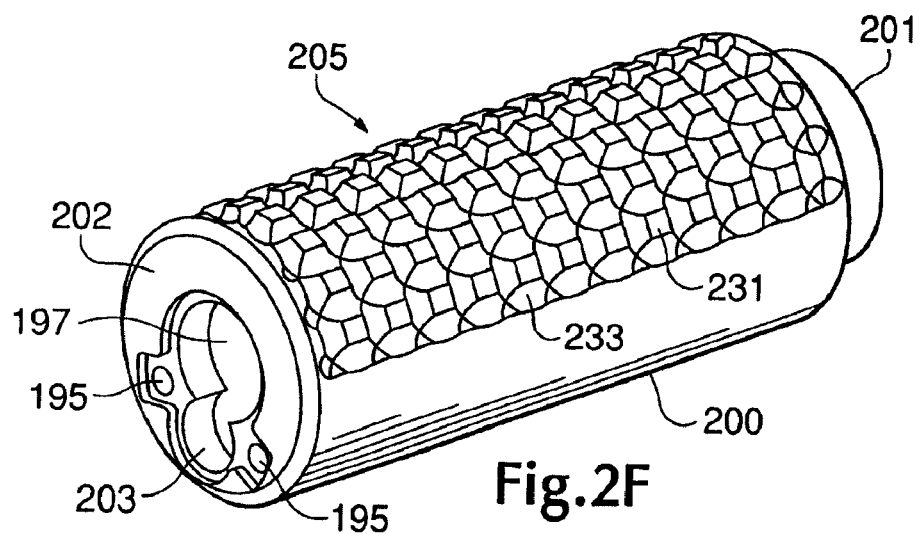
FIG. 2F is a perspective view of the roller peg.

FIG. 2F is a perspective view of the roller peg 15. The housing 200 is arranged so that the patterned surface 205 is facing upward, with the hole 204 (not shown) facing downward. This is the typical alignment of the roller peg when in use. However, in alternative configurations, the forward or backward angle at which the roller 210 (not shown) meets the grinding surface is adjusted by a attaching the housing 200 at a different radial position about a center axis for the axle of the bicycle. These different radial positions of the roller peg may be used for different bicycle stunts. For example, the roller 210 may be rotated and attached more toward the front of the bicycle for certain tricks or rotated and attached more toward the rear of the bicycle for other tricks.

The patterned surface 205 is formed on the housing 200 substantially opposite from the roller 210. The multiple spaced protuberances 231 include square faces each with 4 outwardly sloping sides 233. The bottom end of housing 200 has a smooth surface.

On the outer end 202 of the housing 200 the large hole 197 is used for inserting the roller 210 and the smaller hole 203 is used to insert the pin 230. The screw holes 195 detachably affix the keeper (240 of FIG. 2A) to housing 200. As seen in FIG. 2A, the keeper 240 is of a substantially oblong shape. However, other embodiments of the invention contemplate providing keepers 240 that have different shapes according to the tastes of style-conscious bikers. For example, a variety of geometric shapes are possible or fanciful designs such as stars or skulls. In some embodiments of the invention, the keeper 240 may be of a different color than the housing 200.

Figure 2G:
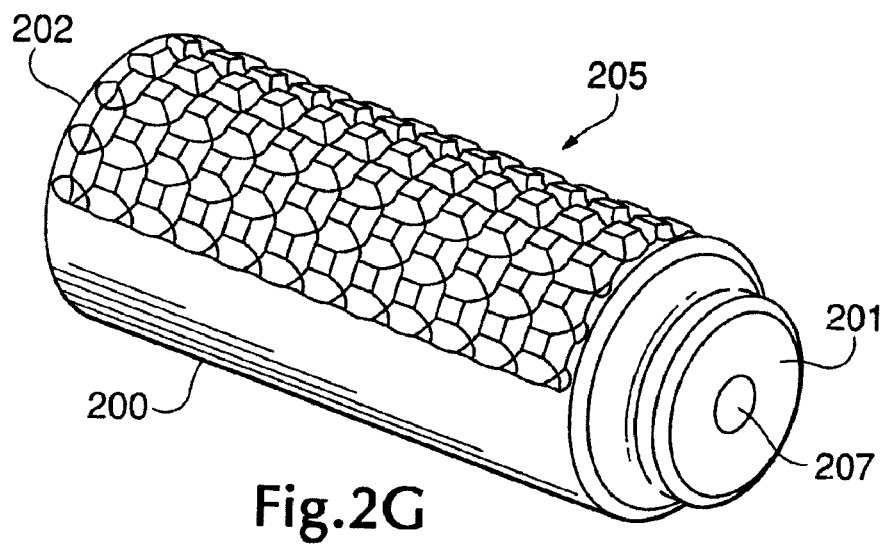
FIG. 2G is a second perspective view of the roller peg.

FIG. 2G is another perspective view of the roller peg. In this view the inner edge 201 of the housing 200 is facing the viewer. Referring to FIGS. 2B and 2G, there is a hole 207 in the middle of the inner edge 201. The hole 207 receives the end of the bicycle axle 17 as shown in FIG. 2B. The hole 207 may be threaded for interlocking with the axle 17 or alternatively the housing 200 may be held to the axle with a nut 209 that is screwed onto the bicycle axle 17 after the axle 17 is inserted into hole 207.

Embodiments of the invention may be made of a variety of different materials. A typical embodiment may have a housing 200 of an aluminum alloy, a steel pin 230, a heavy duty PVC roller 210, and a metal keeper 240. Other embodiments of the invention may have some type of tread pattern on the surface of the roller 210, or the roller could be made of another type of durable rubber besides PVC, or the roller could even be of metal. Embodiments of the invention may also have components with different colors. For example, one embodiment may have a silver aluminum housing 200, a blue aluminum keeper 240, and a black PVC roller 210. Still other embodiments of the invention may have bearings incorporated into the housing 200 to allow the pin 230 and roller 210 to spin with even less friction.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. A roller peg comprising:
    a housing having a bicycle or skateboard attachment region for attaching to a bicycle or a skateboard, the housing including a hole; and
    a roller that is substantially cylindrical in shape, the roller structured to be inserted in the housing so that a surface of the roller protrudes from the hole and the roller spins within the housing.

2. The roller peg of claim 1, wherein the housing includes an aluminum alloy and the roller includes a plastic material.

3. The roller peg of claim 1, further comprising a pin that is structured to be inserted through a center of the roller and that is structured to engage opposite sides of the housing.

4. The roller peg of claim 1, wherein at least a portion of an outer surface of the housing includes a patterned region having raised and lowered surfaces for improving frictional engagement with footwear.

5. The roller peg of claim 1, wherein at least a portion of an outer surface of the housing is designed to frictionally engage footwear.

6. A roller peg comprising:
    a housing attachable to a bicycle or a skateboard, the housing including a hole; and
    a roller that is substantially cylindrical in shape, the roller structured to be inserted in the housing so that a surface of the roller protrudes from the hole and the roller spins within the housing;
    the housing structured to be attached to an axle of the bicycle or skateboard.

7. The roller peg of claim 6, the housing structured to hold the roller such that an axis of rotation for the roller is parallel to the axle.

8. The roller peg of claim 6, the housing structured to be rigidly attached to the axle.

9. The roller peg of claim 8, the housing structured to be detached from the axle without compromising the structural integrity of the housing.

10. A device structured to be held by a housing having a first end that is configured to be affixed to a bicycle or skateboard, the housing having a second end disposed opposite the first end, the housing having a hole located between the first end and the second end, the device comprising:

a roller, the roller configured to protrude from the hole and configured to spin around an axis that is parallel to a line that passes through the first end and the second end of the housing.

11. The device of claim 10, wherein the roller is substantially cylindrical in shape.

12. The device of claim 11, the roller having a hole running lengthwise through the roller, the hole structured to accept a pin that engages the housing at the first end and at the second end.

13. The device of claim 10, wherein the roller is structured to be detachably affixed to the housing.

14. The device of claim 10, the roller comprising a plastic material.

15. The device of claim 10, wherein at least a portion of an outer surface of the housing includes a plurality of protuberances.

16. The device of claim 10, further comprising one or more bearings inside the housing, the bearings configured to allow the roller to spin freely around the axis of rotation.

17. A roller having a connection region to affix structured to be to a bicycle or a skateboard by a housing that partially covers the roller, the roller structured to spin around an axis of rotation that is defined by the housing, the housing maintaining the axis of rotation in a fixed relationship to the bicycle or the skateboard;

wherein the roller is substantially cylindrical.

18. The roller of claim 17, wherein the roller is structured to be detachably affixed to the housing.

19. The roller of claim 17, the roller having a hole running lengthwise through the roller, the hole structured to accept a pin that engages the housing at a first end of the housing and at a second end of the housing.

20. The roller of claim 17, the roller comprising a plastic material.

21. The roller of claim 17 wherein the connection region includes an opening to receive a pin to attach the roller to the housing.

22. The roller of claim 17 wherein the roller is insertable into the housing to expose a downwardly facing curved side of the substantially cylindrically shaped roller when the bicycle or the skateboard is upright.

* * * * *